Sept. 16, 1969 R. R. PETERSON ET AL 3,467,353

TUBE FORM MOUNTING

Filed Aug. 2, 1966

Robert R Peterson
Warren E. Schmidt
Philip R Woodford
INVENTORS

BY Ralph Hammar
Attorney

United States Patent Office 3,467,353
Patented Sept. 16, 1969

3,467,353
TUBE FORM MOUNTING
Robert R. Peterson, Warren E. Schmidt, and Philip R. Woodford, Erie, Pa., assignors to Lord Corporation, Erie, Pa., a corporation of Pennsylvania
Filed Aug. 2, 1966, Ser. No. 569,697
Int. Cl. F16f *15/04;* B29c *25/00;* B23p *11/02*
U.S. Cl. 248—358   4 Claims

ABSTRACT OF THE DISCLOSURE

A tube form mounting having a body of elastomer vulcanized under heat and pressure between and bonded to inner and outer tubular members in which the coefficient of thermal expansion of the outer tubular member is greater than the coefficient of thermal expansion of the inner member whereby upon cooling the differential thermal expansion counteracts the shrinkage of the elastomer and relieves the tension.

---

In tube form mountings in which the elastomer is bonded during vulcanization, shrinkage puts the elastomer under initial tension which decreases the load carrying ability. This invention is intended to overcome this problem by making the non elastomeric parts of the mounting of materials having different coefficients of thermal expansion so that differential expansion tends to overcome or counteract the effect of the shrinkage of the elastomer.

Figure 1:
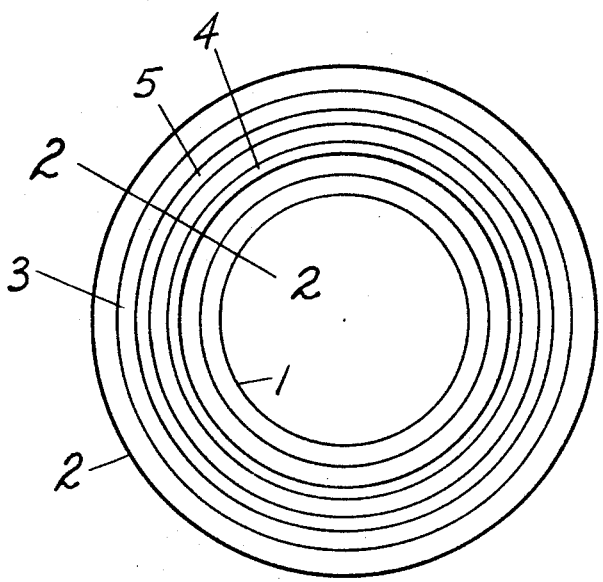
Figure 2:
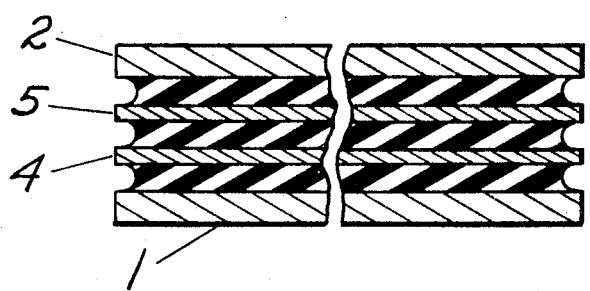
Figure 3:
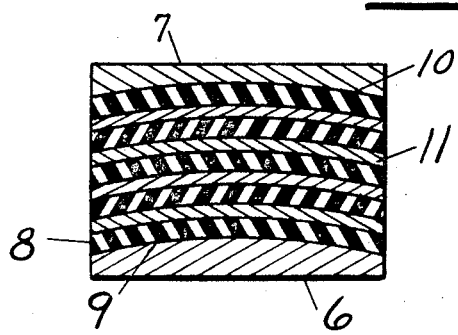

In the drawing, FIG. 1 is an end view of a tube form mounting, FIG. 2 is a section on line 2—2 of FIG. 1, and FIG. 3 is a section similar to FIG. 2 of a modification in which the tubular members have concentric spherical surfaces.

The tube form mounting has concentric inner and outer tubular members 1 and 2 and a body 3 of elastomer between and bonded to the members 1 and 2. The bonding preferably takes place during vulcanization under heat and pressure and the shrinkage of the elastomer would ordinarily place the elastomer under radial tension which has an adverse effect upon the load carrying ability and fatigue life of the elastomer. In order to increase the radial load carrying ability of the mounting, concentric tubular shims 4, 5 are embedded in and bonded to the elastomer. The primary function of the shims is to restrain bulging of the elastomer under radial compression loads.

Tube form mountings are used for vibration isolation and are also used as torsion springs, joints and bearings. The term tube form mounting is used to include the other uses.

In order to prevent the radial tension of the elastomer caused by shrinkage, the non elastomeric parts are made of metals or materials having different coefficients of thermal expansion. In addition to metals, plastics are available which have the strengtth and rigidity to serve as substitutes for metal and which also have wide variations in coefficients of thermal expansion. By way of example and not by way of limitation, the inner tubular member 1 may be of a low expansion nickel alloy such as Ni36 whose coefficient of expansion is $1 \times 10^{-6}$ inches per inch per degree Fahrenheit. The tubular shim 4 may be of 410 stainless steel having a coefficient of expansion of $5.5 \times 10^{-6}$ inches per inch per degree Fahrenheit. The tubular shim 5 may be of 302 stainless steel having a coefficient of thermal expansion of $9.6 \times 10^{-6}$ inches per inch per degree Fahrenheit. The tubular member 2 may be aluminum having the coefficient of expansion of $13 \times 10^{-6}$ inches per inch per degree Fahrenheit. During vulcanization, the inner tubular member 1 has negligible expansion but the other parts 2, 4, 5 expand radially outward. The elastomer also expands. Upon cooling, the parts 2, 4, 5 contract radially inward and compensate for the contraction of the elastomer. The differential contraction of the parts 2, 4, 5 may even place the elastomer under a slight compression. It is not necessary that there be complete compensation for the shrinkage or contraction of the elastomer.

The FIG. 3 tube form mounting has inner and outer members 6 and 7 bonded to a body 8 of elastomer. The inner member 6 has an outwardly presented crowned or spherical surface 9 and the outer member 7 has an inwardly presented crowned or substantially concentric spherical surface 10. Bonded in the elastomer are a plurality of nested sheet metal shims 11 having crowned or spherical surfaces substantially concentric with the surface 9 and 10. The purpose of the spherical surfaces is to decrease the cocking stiffness of the joint. As in FIGS. 1 and 2, the thermal coefficient of expansion is graded, increasing in proportion to diameter so the shrinkage of the outer member 7 and shims 11 counteracts the shrinkage of the elastomer and relieves the tension which would otherwise result.

What is claimed as new is:
1. A tube form mounting having a body of elastomer vulcanized under heat and pressure between and bonded to inner and outer tubular members, the coefficient of thermal expansion of the outer tubular member being greater than the coefficient of thermal expansion of the inner member whereby upon cooling the differential thermal expansion counteracts the shrinkage of the elastomer and relieves the tension.
2. The mounting of claim 1 having one or more tubular shims bonded in the elastomer and having a coefficient of thermal expansion intermediate that of the inner and outer members.
3. The mounting of claim 2 in which the inner and outer members and the shims have substantially concentric spherical surfaces.
4. The mounting of claim 2 in which the coefficient of thermal expansion of the shims increases in proportion to the diameter of the shims.

References Cited

UNITED STATES PATENTS

| | | |
|---|---|---|
| 1,928,763 | 10/1933 | Rosenberg. |
| 2,382,569 | 8/1945 | Kilborn _____ 138—143 |
| 2,424,878 | 7/1947 | Crook. |
| 3,028,665 | 4/1962 | Hirst. |
| 3,165,569 | 1/1965 | Bright _____ 264—313 |
| 3,262,693 | 7/1966 | Hirst. |

ROY D. FRAZIER, Primary Examiner

U.S. Cl. X.R.

29—447, 450; 138—143; 264—342; 267—1